Figure 1:
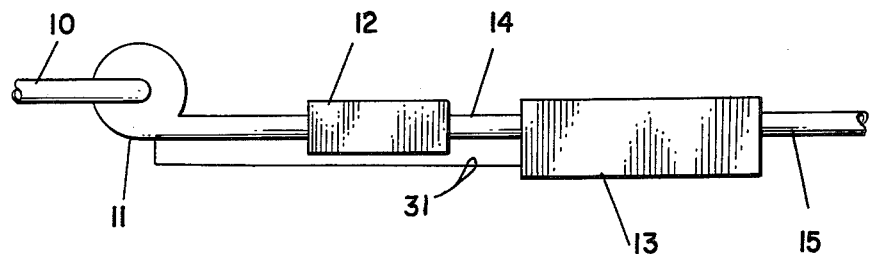

Feb. 26, 1963   R. H. RUFFIN   3,079,498
SWIMMING POOL WATER PURIFIER
Filed July 15, 1960

INVENTOR.
ROBERT H. RUFFIN
BY Elliott & Pastoriza
·ATTORNEYS·

United States Patent Office 3,079,498
Patented Feb. 26, 1963

3,079,498
SWIMMING POOL WATER PURIFIER
Robert H. Ruffin, Canoga Park, Calif., assignors, by direct and mesne assignments, to Ruffin-Hoebel Corporation, a corporation of California
Filed July 15, 1960, Ser. No. 43,105
5 Claims. (Cl. 250—45)

This invention relates generally to accessories for swimming pools and more particularly, to a novel swimming pool water purifier for disinfecting the swimming water.

Heretofore, the purification of swimming pool water has been accomplished by employing a germicide such as chlorine. Generally, a given amount of chlorine, depending on the volume of water to be treated, is added at periodic intervals; for example, every eight hours. While chlorine is effective, it is generally uncomfortable to a swimmer using the pool relatively soon after chlorine has been added. Strong concentrations of chlorine in a swimming pool can be very irritating to a swimmer's eyes as is well known to pool users.

As a consequence, it has become the practice to add chlorine to a swimming pool in the late evening hours so that its irritating qualities are not so pronounced for swimmers using the pool the following day.

The germicidal effects of chlorine or equivalent disinfectants added to a pool usually decrease with time so that if a relatively long period exist between the addition of such germicide or disinfectant and actual use of the pool, the effectiveness of the germicide itself is materially reduced. Accordingly, when pools are not used until the day following a given treatment, the disinfectant may be too weak to be of any value. There is probably no other single problem encountered in connection with swimming pools quite as annoying and irritating as that of maintaining the pool water bacteria free and safe for general use.

With the above in mind, it is a primary object of this invention to provide a novel water purifying means for swimming pools which avoids or substanially reduces requirements for chlorine or equivalent liquid-type disinfectants which are presently in general use.

More particularly, it is an object to provide a swimming pool water purifier which is adapted for completely automatic operation and which will maintain a high germicidal effectiveness while the pool is in use to the end that the water is at all times pure and safe for general use.

Another important object is to provide a water purifying means which does not in any way add irritating ingredients to the water so that users of the pool are not aware of any foreign substance whatsoever in the swimming water itself.

More general objects of the invention are to provide a novel swimming pool water purifier in the form of a compact unit which may be economically manufactured and readily installed for use with any conventional swimming pool.

Briefly, these and many other objects and advantages of this invention are attained by treating water used in the pool to germicidal eletcro-magnetic radiation. Towards this end, there is provided an elongated enclosure or chamber adapted for connection to the water line from either the pump or filter supplying the pool with water. The enclosure includes suitable inlet and outlet water passages and has one enclosing wall in the form of a window comprised of material transparent to 2537 angstrom unit germicidal ultra-violet radiation.

Cooperating with the elongated box-like enclosure is a cover hinged to one edge thereof housing suitable ultra-violet light tubes for providing the germicidal radiation. The arrangement is such that closing down of the cover will dispose the radiation tubes adjacent to the transparent window so that water passing through the enclosure is irradiated with the germicidal energy. Opening of the cover provides ready access to the tubes for maintenance or replacement.

The unit also includes a baffle structure within the enclosure to cause the water to follow a circuitous path so that it is subjected to the radiation for a duration of time sufficient to kill all harmful bacteria and substantially disinfect the water.

Figure 2:
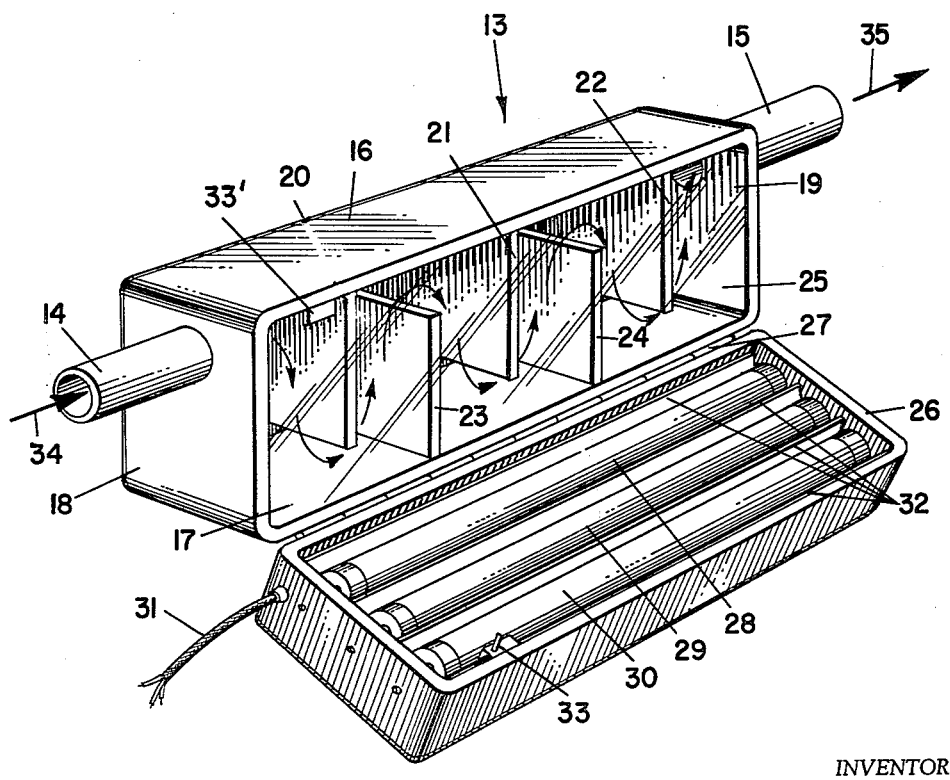

A better understanding of the invention will be had by now referring to a preferred embodiment thereof as illustrated in the accompanying drawings, in which:

FIGURE 1 is a schematic block diagram illustrating the manner in which the purifier of this invention may be employed in conjunction with other components in a conventional swimming pool; and FIGURE 2 is an enlarged perspective view of a preferred form of purifier in accordance with the present invention.

Referring to FIGURE 1, there is shown a water line 10, pump 11, and conventional pool filter 12. The filter 12 may be of a simple screen mesh type for removing small particles and other debris in the pool water. The purifier of the instant invention is illustrated schematically at 13 with an inlet line 14 and outlet line 15. Purified bacteria-free disinfectant water is provided at the outlet line 15 for use in the pool. If desired, the unit could be connected between the filter and pump or at any other convenient location in the water line connecting to the swimming pool.

Referring now to FIGURE 2, the water purifier 13 is shown in detail as comprising an elongated box structure having longitudinal side walls 16 and 17, first and second end walls 18 and 19, and a floor 20. The inlet water pipe 14 passes through the first end wall 18 and the outlet water pipe 15 passes from the second end wall 19.

Included within the enclosure is a baffle structure which may comprise first partitions such as illustrated at 21 and 22 extending normally from the longitudinal side wall 16 towards the opposite longitudinal side wall 17 to terminate short of the side wall as shown. Similarly, second partitions such as illustrated at 23 and 24 may extend from the side wall 17 towards the first side wall 16 to terminate short of the first side wall. The first and second partition structures overlap and are interleaved as shown to define a circuitous path for water passing into the inlet 14 and out the outlet 15.

The top or front open portion as viewed in FIGURE 2 is entirely enclosed by a window 25 which may comprise a suitable glass material transparent to germicidal electromagnetic radiation. Both the floor and window engage the edges of the baffle partitions so that these enclosures with the overlapping characteristic of the partitions define the circuitous passage for the water as shown by the various arrows indicating flow directions.

The structure is completed by a cover member 26 hinged at 27 to the longitudinal edge of the side wall 17. This cover member is recessed to accommodate a plurality of ultra-violet light tubes 28, 29, and 30 running longitudinally from one end of the cover to the other and connected to be energized from input electrical leads 31. Preferably, the cover 26 is provided with suitable curved reflectors 32 for directing portions of the energy radiated by the tubes through the window 25 when the cover is closed. The circuit for the various tubes includes a safety switch 33 arranged to cooperate with a portion 33' on the enclosure itself to close the switch when the cover member is closed. When the cover 26 is opened, the switch 33 is released to open position to open the power circuit to the tubes.

The operation of the water purifying unit will be evident from the foregoing description. Initially, the unit as described in connection with FIGURE 1 is inserted at any convenient location within the water line connecting to the swimming pool. The power leads 31 may be connected to the circuit operating the pump 11 as schematically indicated in FIGURE 1 so that energy will be supplied to the light tubes whenever the pump is energized. With the cover 26 closed, the utra-violet light tubes will thus be energized when the pump 11 is turned on and water passing into the inlet pipe 14 as indicated by arrow 34 will be forced to travel the circuitous path about the baffles before passing from the outlet as shown by the arrow 35. The water will thus be irradiated through the transparent window 25 for a duration sufficient for proper germicidal action to take place.

If it is desired to service the unit, the cover may be readily opened and the tubes replaced. Further, with the cover open, it is possible to observe the water flow about the baffles and thus detect any problems that may arise. Generally, however, the simplicity of the entire structure is such that very little maintenance is required. The necessary electrical components including transformers and the like for energizing the ultra-violet tubes may be housed within the cover and properly connected to the input power leads 31 so that the device may be operated from conventional power sources supplying the pump.

By connecting the unit for operation simultaneously with the pump, the action of the unit is entirely automatic. On the other hand, the unit could be separately powered if a manual or other type pump is used. The only power absorbed of any importance is that for energizing the lights. Accordingly, a suitable timing device may be provided in the absence of automatic controls for the pump to energize the lights at periodic intervals for a sufficient length of time to effect the necessary germicidal action on the water recirculated in the pool.

From the above description, it will be evident that the present invention has provided a novel purifying system for swimming pools. Not only are the disadvantages formerly associated with chlorine and equivalent liquid disinfectants substantially reduced but the additional labor and other operations in using such prior disinfectants are also minimized. The entire unit is relatively compact and may be economically manufactured. Once installed, the mechanical portions of the device, at least, should last for the life of the pool.

While only a few baffles have been shown as well as only three ultra-violet tubes, it should be understood that the path followed by the water may be greatly increased by adding further baffles or changing the overall length of the entire unit. Moreover, additional tubes may be included to increase the overall intensity of the energy passed through the transparent window 25. The number of components and size of the unit may thus be changed in accordance with the required capacity of any particular sized pool with which the unit is to be used. Alternatively, a given sized unit may be used in conjunction with small amounts of conventional disinfectants, which small amounts do not exhibit any detectable irritants.

Thus, various changes falling clearly within the scope and spirit of this invention will readily occur to those skilled in the art. The swimming pool water purifier is therefore not to be thought of as limited to the one embodiment set forth merely for illustrative purpose.

What is claimed is:

1. A swimming pool filter purifier for insertion into a water line connecting through a pump to said pool, comprising: an elongated enclosure having one longitudinal wall thereof constituting a window made of material transparent to germicidal electromagnetic radiation; a water inlet means at one end of said enclosure; a water outlet means at the other end of said enclosure, said inlet and outlet means being connected in series with said water line and pump; baffle structure in said enclosure defining a circuitous path over the inside of said window between said inlet and outlet means; and means for generating germicidal electromagnetic radiation adapted to be disposed adjacent to the outside of said window for irradiating water while flowing along said circuitous path.

2. A swimming pool purifier according to claim 1, including a cover member hinged to said enclosure for swinging movement from an open position to a position covering the outside of said window, said means for generating germicidal electromagnetic radiation being secured to the under side of said cover.

3. A swimming pool water purifier for connection into a water line including a pump for recirculating water in said swimming pool, comprising, in combination: an elongated box structure having substantially parallel longitudinal side walls, first and second end walls, and a floor; water inlet means passing to said box through said first end wall; water outlet means passing from said box through said second end wall; a baffle structure in said box comprising first partitions initiating at one side wall and extending normally towards the opposite side wall to terminate short of said opposite side wall, and second partitions initiating at said opposite side wall and extending towards said one side wall to terminate short thereof, said first and second partitions overlapping and being interleaved; a window transparent to germicidal electromagnetic radiation sealed to the longitudinal edges of said side walls and transverse edges of said end walls, said baffle structure extending between said floor and window with their respective sides in engagement therewith to define a circuitous path for water entering said water inlet means and passing to said water outlet means; and a cover member hinged to one of said longitudinal edges and adapted to close over said window, said cover member including germicidal energy generating means, whereby water passing through said baffle structure when said cover is closed is irradiated by said energy for a sufficient duration to purify said water.

4. A swimming pool purifier according to claim 3 in which said cover includes a recessed area, said generating means comprising a plurality of ultra-violet light tubes providing 2537A wave length germicidal energy extending longitudinally within said recessed area in side-by-side relationship; and reflector means disposed behind said tubes in said recessed area for directing portions of energy radiated from said tubes through said window when said cover is closed.

5. A swimming pool water purifier according to claim 4, including input power leads connected between said pump and said cover; and switch means secured to said cover and positioned to be engaged and closed by a portion of said box when said cover is closed, for connecting said power leads to said generating means so that said ultra-violet light tubes are energized when said pump is energized, said switch means being opened automatically in response to opening of said cover to de-energize said generating means.

References Cited in the file of this patent

UNITED STATES PATENTS

| | | |
|---|---|---|
| 2,338,387 | Whitman | Jan. 4, 1944 |
| 2,504,349 | Priete | Apr. 18, 1950 |
| 2,667,584 | Rhodes | Jan. 26, 1954 |
| 2,669,661 | Riddiford | Feb. 16, 1954 |